(No Model.)  3 Sheets—Sheet 1.

F. KNAUER.
OPTHALMOSCOPE.

No. 563,717.  Patented July 7, 1896.

Attest:
Howell Battle.
Geo. M. Whitney.

Inventor:
Friederich Knauer
by his attorney (No Model.) 3 Sheets—Sheet 2.

F. KNAUER.
OPTHALMOSCOPE.

No. 563,717. Patented July 7, 1896.

Attest:
Howell Bartle
Geo. M. Whitney

Inventor:
Friederich Knauer
by his attorney (No Model.) 3 Sheets—Sheet 3.
F. KNAUER.
OPTHALMOSCOPE.
No. 563,717. Patented July 7, 1896.
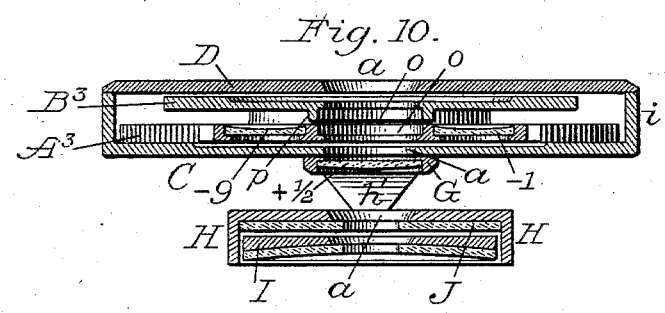
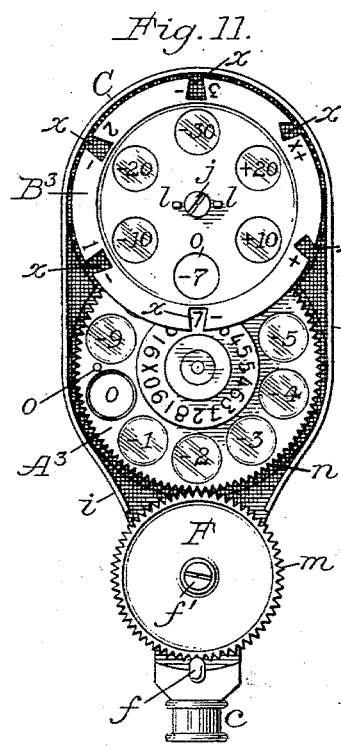
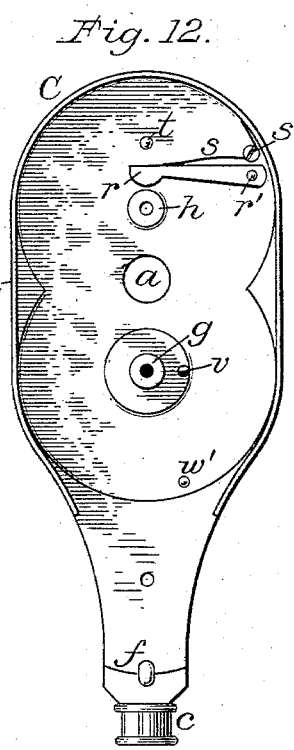
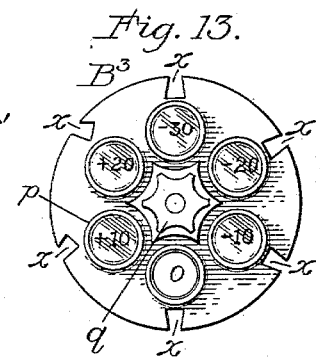
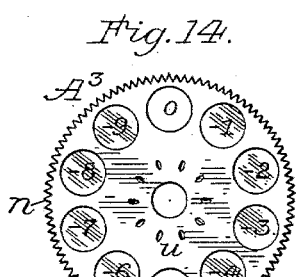
Attest:
Howell Bartle.
Geo. M. Whitney.
Inventor:
Friedrich Knauer
by his attorney,

UNITED STATES PATENT OFFICE.

FRIEDRICH KNAUER, OF WIESBADEN, GERMANY, ASSIGNOR TO EMIL B. MEYROWITZ, OF NEW YORK, N. Y.

OPHTHALMOSCOPE.

SPECIFICATION forming part of Letters Patent No. 563,717, dated July 7, 1896.

Application filed November 29, 1895. Serial No. 570,379. (No model.) Patented in Germany September 12, 1893, No. 76,618.

*To all whom it may concern:*

Be it known that I, FRIEDRICH KNAUER, doctor of medicine, a subject of the German Emperor, and a resident of Wiesbaden, Germany, have invented a new and useful Improvement in Ophthalmoscopes, (patented to me in Germany by Letters Patent No. 76,618, bearing date September 12, 1893,) of which the following is a specification.

This invention relates to ophthalmoscopes for testing the focus of vision by means of dioptric lenses.

It consists in the combination of a pair of rotary lens-carrying disks, hereinafter termed "lens-disks," provided in a peculiar manner with numerals and signs, together with notches or holes, hereinafter termed "excisions," through which characters behind may be read, so divided between the two disks, and so arranged, that when any lens of the first disk is brought over any lens of the second disk, so as to be combined therewith, the combined value of the lens combination will be indicated by means of appropriate characters on both disks. These characters may consequently be few in number and relatively large and clear, thus avoiding mistakes in reading them and facilitating the combination of a large number of lenses in a portable instrument of small size.

Three sheets of drawings accompany this specification as part thereof.

Figure 1:
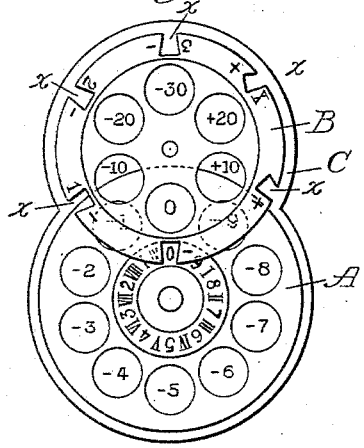
Figure 2:
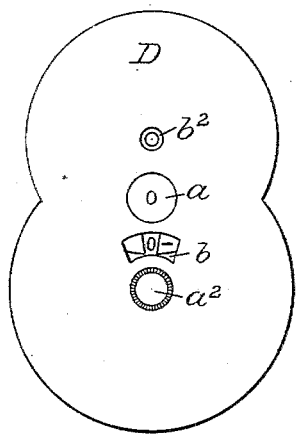
Figure 3:
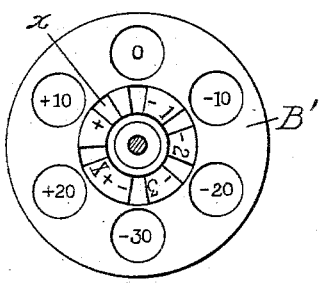
Figure 4:
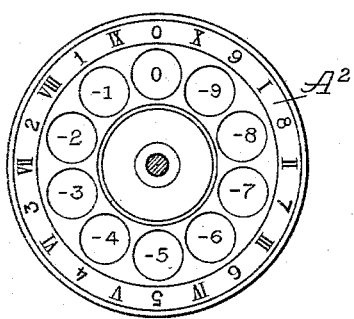
Figure 5:
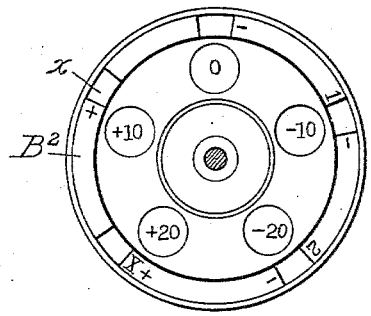

Figures 1 and 2 are internal and external face views, respectively, of an ophthalmoscope embodying the principle of this invention. Figs. 3, 4, and 5 are face views of lens-disks detached, illustrating modifications. Figs. 6 to 14, inclusive, are views of a more elaborate ophthalmoscope and parts thereof embodying the same invention, Fig. 6 being an external face view, Fig. 7 a back view, Fig. 8 an edge view, Fig. 9 an end view of the handle, half in section, Fig. 10 a magnified cross-section on the line 10 10, Figs. 6, 7, and 8, Figs. 11 and 12 internal face views of the body of the instrument with and without the lens-disks and their actuator, and Figs. 13 and 14 are back views of the respective lens-disks removed in Fig. 12.

Like letters of reference indicate corresponding parts in all the figures.

In each of the instruments represented by the drawings there are a pair of rotary lens-disks A and B, A' and B', $A^2$ and $B^2$, or $A^3$ and $B^3$, provided with numerals, signs, and excisions, as aforesaid, the latter being shown at $x$.

In the arrangement represented by Figs. 1 and 2 the lens-disks A and B revolve, respectively, around two centers parallel with each other, by which the lenses are supported between a back plate C and a face plate D, both plates being provided with a central opening $a$, Fig. 2, to look through, and the plate D with an additional opening $b$, through which to read the number and the appropriate sign, plus or minus, corresponding with the lens combination which is at any time in position at $a$. The lens-disks A and B overlap each other, and are so proportioned that any one lens of disk A can be brought behind and thus combined with any one lens of disk B. The disks may be turned, respectively, by knobs $a^2$ and $b^2$ in front of the face plate D, the stems of these knobs forming the centers of the respective disks.

The disk A, besides a plain lens, or preferably an empty lens-opening, (indicated in Figs. 1 and 2 by O at $a$,) contains nine concave lenses from 1. D (one diopter) to 9. D (nine diopters) inclusive. In line with radii drawn from the center of the disk through the centers of the respective lenses it is marked in Arabic numerals with the value of each lens, "0" to "9," and between said Arabic numerals Roman numerals corresponding to the ten intervals are added. For example, between "9" and "8" the numeral "I," between "8" and "7" the numeral "II," &c., following the rotation of the clock-hands, up to the numeral "X" between "0" and "9." The lens-disk B contains, besides the plain lens or empty lens-opening, concave lenses 10. D, 20. D, and 30. D and convex lenses 10. D and 20. D, (indicated in Fig. 1 by the corresponding numbers $-10, -20, -30, +10, +20$,) and the free rim of this disk is provided with the excisions $x$ so shaped and proportioned that only one character on the disk A can become visible at one time. At the lens-opening O of disk B the excision is situated directly opposite the middle of the lens with the sign "—" (minus or concave) at its right when said lens-opening is at $a$ and said excision at $b$. There are likewise situated opposite the centers of the concave lenses —10, —20, and —30 corresponding excisions; to the left of each the corresponding numerals "1," "2," and "3," and to the right of each the sign "—." At the convex lens 10. D the sign "+" (plus or convex) is opposite the middle of the lens, and to the right of said sign the excision. At the convex lens —20 the Roman numeral "X" is opposite the middle of the lens; to the right of said numeral the excision $x$, and to the right of the excision the sign "+."

When the two lens-disks so constructed are revolved so that the two empty lens-openings are in line with each other at $a$, Fig. 2, there appears at $b$, Fig. 2, within the excision of the disk B beside the sign "—" (minus) the character "0" on the disk A. Now if the disk A is turned in the direction of the clock-hands, there appear in the excision of the disk B, in rotation, the numerals "1" to "9," and in place of the empty lens-opening of the disk A, at $a$, Fig. 2, there appear in succession the concave lenses —1 to —9, corresponding with said numerals respectively, while the empty lens-opening of disk B remains at $a$. To obtain the concave or minus values from 10. D to 19. D, the disk B is so rotated that in place of its empty lens-opening its lens —10 moves into place. When the disk A is turned one lens further, its empty lens-opening is covered by the lens —10 of the disk B. In the excision of the disk B the character "0" appears between the numeral "1" and the sign "—," so that the value of the combination (0 and —10 equaling —10) can be read at once. If the disk A alone is now further rotated in the same direction, its lenses —1 to —9 inclusive are brought in succession behind said lens —10 of the disk B at $a$, and in place of the character "0" at $b$ the characters "1" to "9" appear in succession beside the character "1" on the disk B, forming the numbers "11," "12," "13," &c., up to "19," which again exactly correspond to the value of the respective lens combinations. In the same manner the lens values —20. D to —39. D and the corresponding numbers are obtained by advancing the lenses —20 and —30 successively in place of the lens —10 by further rotation of the disk B.

To obtain the positive or convex lens values, beginning again with the empty lens-openings in line with each other at $a$, Fig. 2, as indicated by "0" at $b$, the disk B is turned in the opposite direction as compared with its rotation before described, so that in place of its empty lens-opening its lens +10 is brought into position at $a$. At the same time the disk A is turned in the opposite direction from that of the clock-hands the angular distance of two lenses. The lens —9 will then be covered by the lens +10 and the combination +10 and —9 will give +1. At the same time there will appear at $b$ within the excision of the disk B the Roman numeral "I" beside the sign "+." If now the disk A alone is turned further the concave lenses —8, —7, —6, &c., of the disk A come consecutively in combination with the fixed lens +10 of the disk B, and within the excision of the disk B the Roman numerals "II," "III," "IV," &c., up to "X," corresponding to the lens combinations, will appear beside the sign "+." The higher convex combinations follow in an analogous manner by bringing the convex lens +20 into position at $a$ in place of the lens +10.

From the above it will be seen that whichever two lenses of the disks A and B are combined with each other, the numeral which appears in the corresponding excision of disk B and the numeral on the disk beside the excision make up a number corresponding in value to the diopters of the combined lenses.

With five lenses in the disk B in addition to its empty lens-opening, as above described, and nine lenses in the disk A in addition to its empty lens-opening, sixty lens combinations can be obtained. A large number of lenses in the disk B, which could be arranged for, would have no particular value, as for most ophthalmoscopic examinations even a smaller number of lens combinations is sufficient. In place of five or more lenses the disk B may be provided with four or three combination-lenses, if preferred, without changing the principle of the invention in the least. Furthermore, the concave lenses of the disk A may be replaced by convex lenses of the same focus, provided the disk B is correspondingly provided with convex lenses in place of its concave lenses and concave lenses in place of its convex lenses, without change of focus, and with corresponding excisions, signs, and numerals; and other like modifications will suggest themselves to those skilled in the art.

In each of the two modifications illustrated by Figs. 3, 4, and 5, in connection with Figs. 1 and 2, the two lens-disks A and B' and $A^2$ and $B^2$ are arranged so that without changing the principle of automatically adding the combined lens values they revolve around a common axis and cover each other throughout their entire area between concentric circular back and face plates similar to said face plates C and D. In the arrangement represented by Fig. 3, in connection with Fig. 1, the excisions $x$ are in the form of a circular series of openings in the lens-disk B' within the circle of its lenses, so as to correspond in position with the circular series of numbers on the lens-disk A, Fig. 1, while in the arrangement represented by Figs. 4 and 5 the excisions $x$ are in the form of a circular series of openings at the perimeter of the lens-disk $B^2$, the numbers on the lens-disk $A^2$ being correspondingly located. The characters on the lens-disks B' and $B^2$, respectively, are arranged with reference to the excisions substantially as above described with reference to the lens-disk B, Fig. 1. Fig. 5 further illustrates reducing the number of lenses in what may be termed the "upper" lens-disk, as aforesaid.

Figure 7:
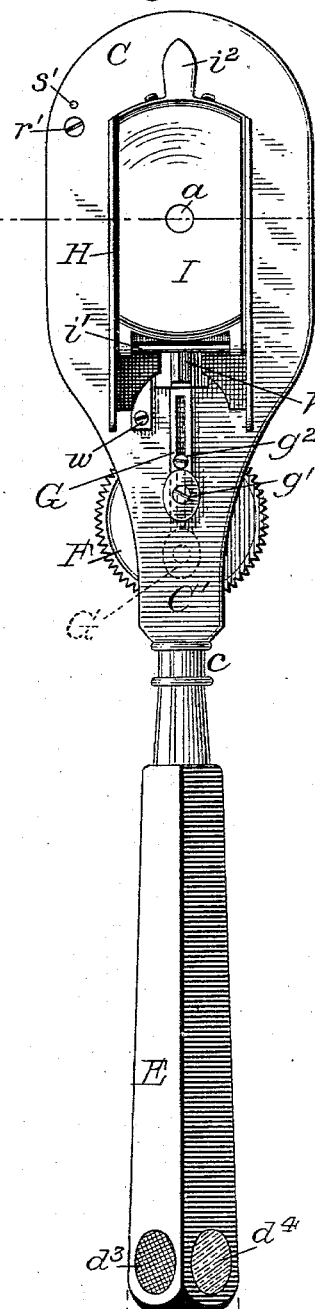
Figure 8:
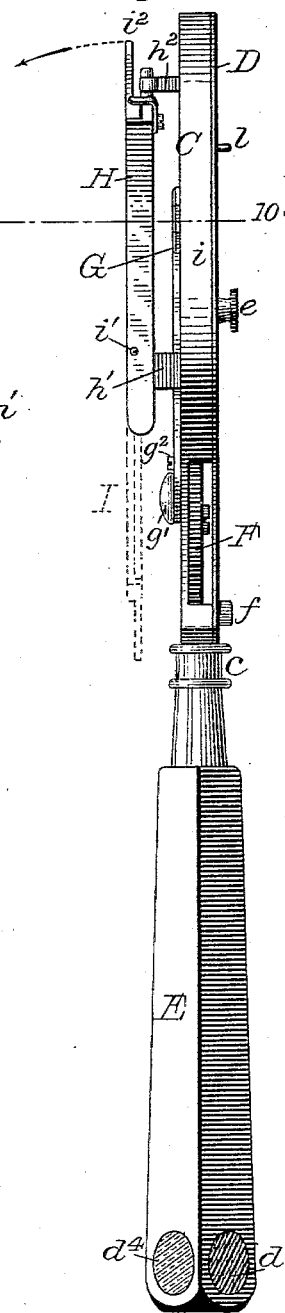
Figure 9:
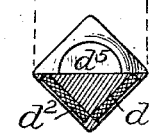

In the instrument represented by Figs. 6 to 14, inclusive, a laterally-tapering downward extension C' of the "back plate" C terminates in a neck c, into which the upper end of a detachable handle E is screwed. Such handle is conveniently four-sided, and its lower end accommodates five color-disks, (marked $d$, $d^2$, $d^3$, $d^4$, and $d^5$ in Figs. 6 to 9,) making it a "hand-perimeter" by which to obtain the color limits of the field of vision. As illustrated by Fig. 9, the color-disks $d$ to $d^4$, inclusive, are preferably of felt, in order that their colors may not be obscured by reflected light, and the respective disks are held within recesses in the handle, the surface of which is preferably black. The end disk $d^5$ is white. The front plate D has a downwardly-tapering lateral extension D', corresponding with said extension C'. It is held in place by a thumb-screw e at the center of the lens-disk $A^3$, Figs. 10 and 11, and a button f at the lower end of the front plate. The lens-disks $A^3$ and $B^3$ are separately pivoted upon posts g and h, Fig. 12, upon the back plate C, within a marginal crown-flange i of said back plate. The disk $A^3$ revolves around the post g and is held in place thereon by the face plate D. The disk $B^3$ is pivoted upon the stud h by means of a countersunk shouldered screw j, Figs. 6 and 11. An opening k, Fig. 6, concentric with this screw is additional to the openings a and b, above described, and serves to expose a pair of lugs l on the lens-disk $B^3$, by means of which this disk may be turned by hand, independently of the disk $A^3$, to quickly change the combination to one much higher or much lower.

Figure 6:
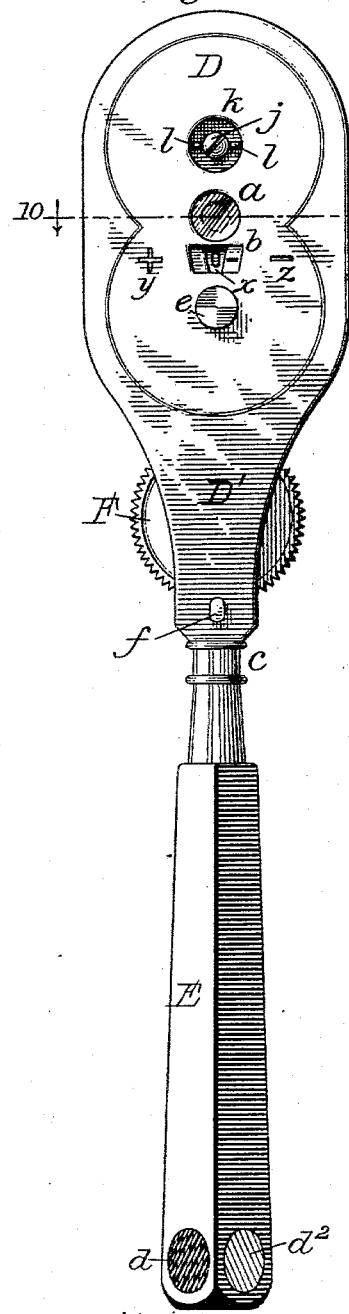

For actuating the lens-disk $A^3$ a finger-wheel F is pivoted, by means of a shouldered screw f', Fig. 11, to the back plate C below its crown-flange i, and is of sufficient diameter to protrude at both lateral edges of the body of the instrument, as shown in Figs. 6, 7, and 11. The periphery of this finger-wheel is provided with spur-teeth m, Fig. 11, which intermesh with like teeth n, formed on the periphery of the lens-disk $A^3$. To automatically actuate the lens-disk $B^3$ when each revolution of the lens-disk $A^3$ in either direction is completed, said lens-disk $A^3$ is further provided with a stud-pin o on its face, Fig. 11, and the lens-disk $B^3$ is provided with projecting rings p, Figs. 10 and 13, on its back, concentric with its respective lens-openings, the effect of their coaction being a sufficient movement of the lens-disk $B^3$ to bring its next succeeding lens into position at a. The interdental notches of a star-pinion q, Fig. 13, on the back of said lens-disk $B^3$, corresponding in number with said rings p, coact with a pivoted detent r, Fig. 12, which is acted on by a light spring s, while its movement is limited by a stop t, Fig. 12. A screw by which said detent is pivoted is shown at r' in Fig. 7, as well as in Fig. 12, and another by which said spring s is held in place is shown at s' in the same figures.

The effect of the detent r is to facilitate centering each of the lenses of the lens-disk $B^3$ at a. For controlling the rotation of the lens-disk $A^3$ in like manner, its back, Fig. 14, is provided with stop-indentations u, which coact with a stop-pin v, Fig. 12, carried by the free end of a spring w, Fig. 7, the attaching-screw of which appears at w' in Fig. 12.

Excepting the character X, all the numerals on the lens-disk $A^3$ are Arabic, those of the respective series of numbers being of different contrasting colors, as white for the minus numbers and red for the plus numbers, on a black ground. The plus and minus characters on the lens-disk $B^3$ are distinguished from each other in like manner, and adjacent to the opening b, through which, in connection with the excisions x of the lens-disk $B^3$, said characters are successively exposed to view, the front plate D is provided with key-characters y and z, Fig. 6, indicating the colors of the respective series.

Behind the back plate C a vertical slide G carries at its upper end a half-diopter lens, (shown at $+\frac{1}{2}$ in Fig. 10,) so that this half-diopter lens may be alined with the opening a, as shown in section in Fig. 10, when the slide is in the projected position in which it is shown in full lines in Fig. 7. When the slide is drawn down, as shown in dotted lines in Fig. 7, the half-diopter lens is withdrawn without otherwise affecting the lens-combination in position at a. The slide G is provided at its lower end with a thumb-piece g', Fig. 7, by which to actuate it, and is attached, guided in part, and stopped in its respective positions by a screw $g^2$, Fig. 7, and a longitudinal slot in the slide, through which said screw is inserted into the extension C' of the back plate C. A slotted projection h' on the back plate coacts with said screw and slot to confine the slide G to a rectilinear path.

A mirror-holder H is hinged in customary manner to said projection h' and a matching projection $h^2$, Fig. 8, and is conveniently provided with concave and flat mirrors I and J, Figs. 7, 8, and 10, the frame of the former being hinged at i' within the holder H, and provided with a finger-piece $i^2$, by means of which it may be readily lowered, as shown in dotted lines in Fig. 8, to expose the flat mirror J. The openings a are repeated in the respective mirrors in customary manner.

The automatic addition of the lens values, apart from that of the half-diopter lens, is accomplished in precisely the same manner as in the arrangement, Figs. 1 and 2, first described. In the condition of the instrument represented in Figs. 6, 8, and 10, and in full lines in Fig. 7, the half-diopter lens is in position at a behind the empty lens-openings O of both lens-disks. Its value may be added in like manner to any of the lens values indicated at $b$. For example, with the lens-disks in the position represented by Fig. 11, with the lens $-7$ of the lens-disk $A^3$ and the lens-opening O of the lens-disk $B^3$ combined at $a$, the addition of the half-diopter lens to the combination would change its value from $-7$ to $-6\frac{1}{2}$. If the indication were $+7$, the projection of the half-diopter slide would change the value of the combination to $+7\frac{1}{2}$, and so on.

In all previous constructions of ophthalmoscopes with combination-lenses the value of the two combined lenses is either individually shown, or a numeral corresponding to the combination is supplied, and in the latter class of ophthalmoscopes as many numerals are arranged on one disk as are required for the representation of the numbers singly. In the above-described invention a great saving of numerals is effected, (for example, in place of one hundred and one only twenty-four numerals are required,) whereby it is made possible to use on the same limited space, in place of small, crowded, and therefore less distinct numbers, corresponding numbers large and easily read; and the numerals on the two disks are automatically added together by their proper juxtaposition, without complication of parts.

Having thus described the said improvement in ophthalmoscopes, I claim as my invention and desire to patent under this specification—

The combination, in an ophthalmoscope, of two rotary lens-disks provided respectively with suitable dioptric lenses in circular series, and a support common to both having an opening $a$ at which the lenses of one disk are combined with those of the other; one disk being further provided with numerals indicative of the value of its lenses respectively, and with intermediate numerals, while the other disk is provided with plus and minus signs, supplemental numerals, and excisions $x$ through which the numerals on the disk first named are exposed to view in proper relation to said signs and supplemental numerals, substantially as hereinbefore specified; whereby the combined values of successive lens combinations are indicated by characters divided between the respective lens-disks, for the purpose set forth.

FRIEDRICH KNAUER.

Witnesses:
CARL ED. MALEY,
PERRY BARTHOLOW.